June 13, 1961
O. G. PHILLIPS
2,987,891
PIPELINE PADDER ASSEMBLY
Filed April 11, 1958
2 Sheets-Sheet 1
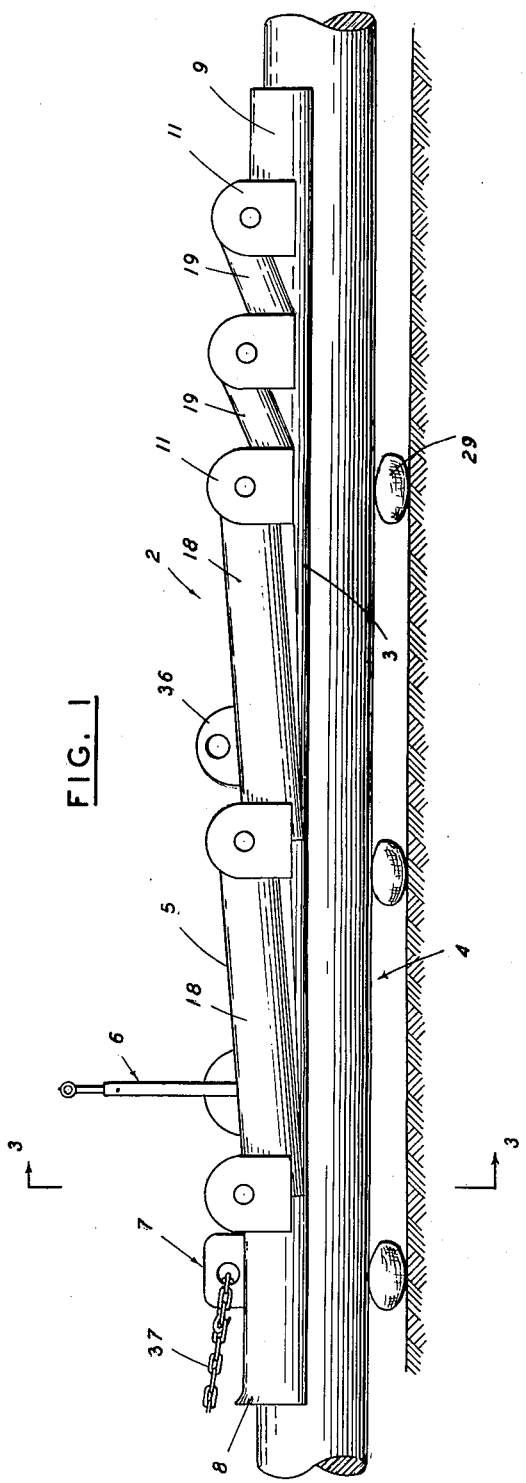
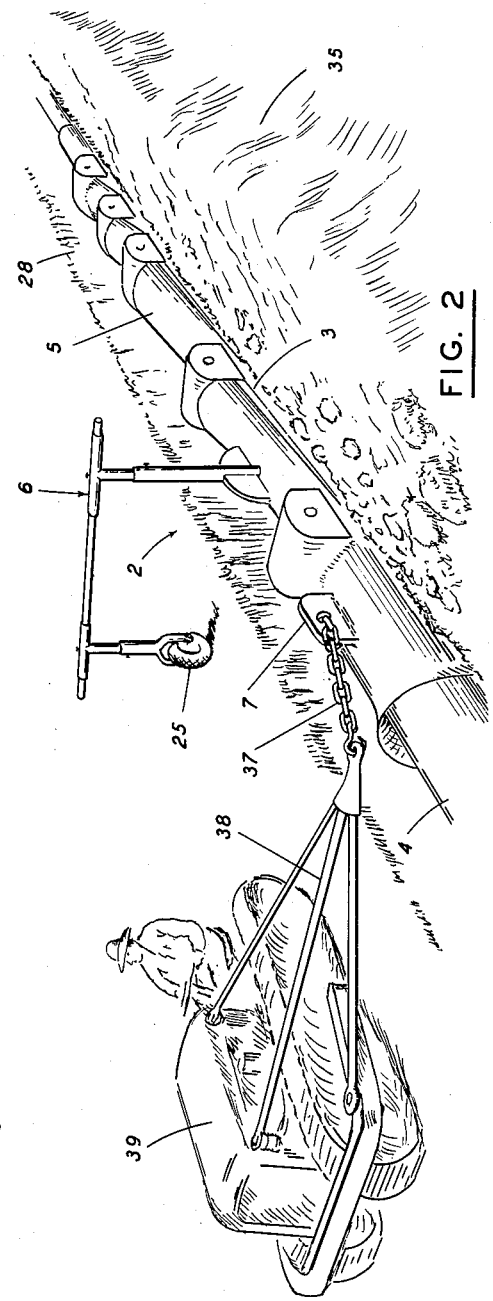
INVENTOR.
OSCAR G. PHILLIPS
BY
F. D. Copeland Jr.
AGENT June 13, 1961 — O. G. PHILLIPS — 2,987,891
PIPELINE PADDER ASSEMBLY
Filed April 11, 1958 — 2 Sheets-Sheet 2
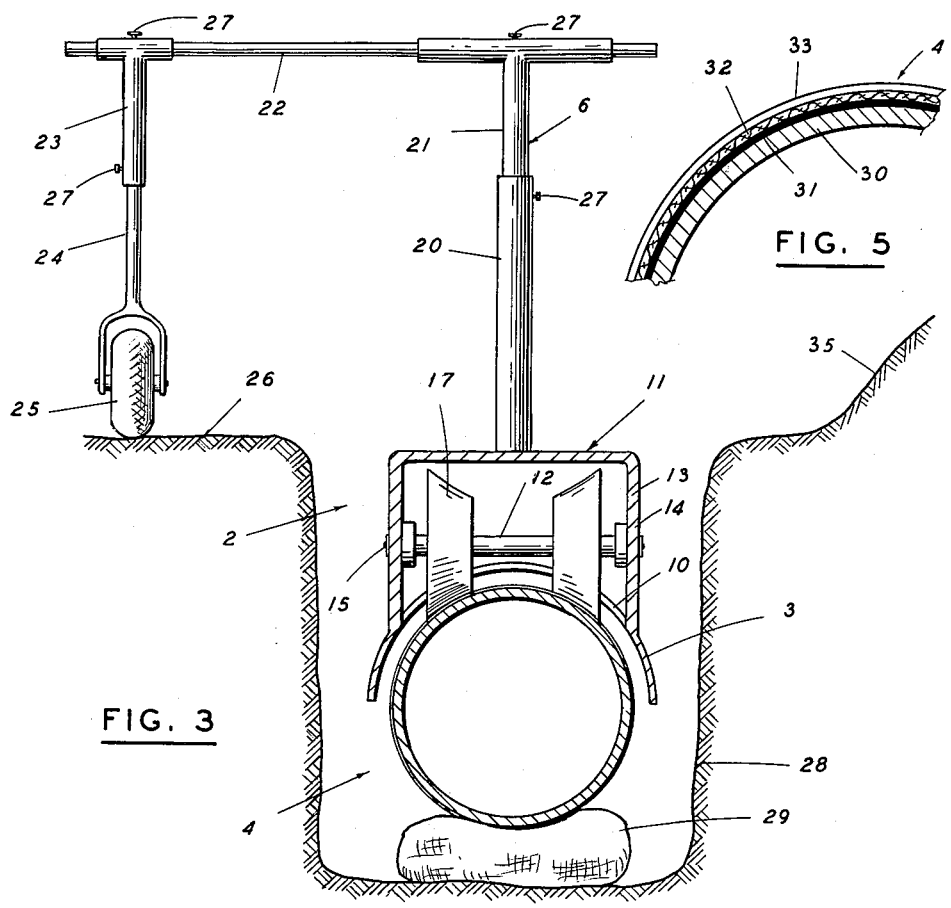
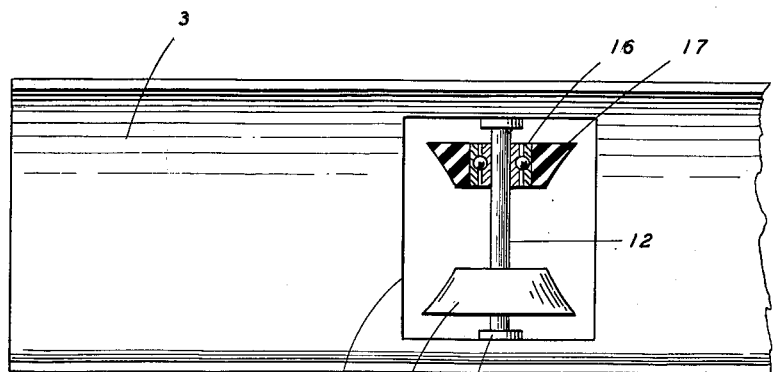
INVENTOR.
OSCAR G. PHILLIPS
BY
J. D. Copeland Jr.
AGENT

United States Patent Office 2,987,891
Patented June 13, 1961

2,987,891
PIPELINE PADDER ASSEMBLY
Oscar G. Phillips, Bridgeport, Tex., assignor of one-third to Thomas D. Copeland, Jr.
Filed Apr. 11, 1958, Ser. No. 727,913
7 Claims. (Cl. 61—41)

This relates generally to equipment used in installing cross-country pipe lines and more specifically to equipment used during the final stages of covering the pipe with earth and rock after it has been placed in its trench.

The primary object of this invention is to provide a new operational tool for pipe line work which will be identified throughout this specification as a "pipe line padder" and which is adapted to roll along the upper surface of the pipe and protect the outer covering of the pipe from damage by falling rocks when the dirt is pushed back into the trench and over the top of the pipe.

Another object of this invention is to provide a method of safely and rapidly backfilling pipe line trenches which comprises rolling a protective shield or padder lengthwise along the pipe just ahead of the bulldozer which does the backfilling and permitting the dozer to dump large heavy rocks and earth directly on the shield and then pulling the shield forward to allow the fill material to then drop gently on the coated pipe.

And a further object is to provide a device by which one pulling tractor and one bulldozer can effectively and safely backfill a pipe line trench without requiring any additional manual labor.

And yet another object is to provide a device for laying over a pipe line in a trench and receive and partially retain backfill earth which is deposited thereon and yet such a device that is so constructed that upon being pulled forward along the pipe it will spill its load in prearranged steps so that at its extreme end where the earth finally contacts the coated pipe it has been largely sifted of its heavy rocks and any small rocks remaining will drop only an inch or so in contacting the pipe.

And another object is to provide a device for padding a coated pipe line during backfilling which is constructed in such a manner that the housing for the rollers to permit the padding device to travel freely along the pipe also acts as a stepping element in the dumping cycle.

And still a further object is to provide an adjustable vertical support arm for a pipe line padder and a means to maintain the arm and the padder in an upright position even during heavy backfilling operations.

These and other objects and advantages will be apparent from an examination of the following specification and drawing in which:

FIG. 1 represents a side elevational view of the pipe line padder of this invention.

FIG. 2 is a perspective view of the device of FIG. 1 and showing the method of this invention.

FIG. 3 is a cross sectional view taken along the lines 3—3 of FIG. 1.

FIG. 4 is a fragmentary bottom view of one roller housing of the device of FIG. 1.

FIG. 5 is a fragmentary cross sectional view of the pipe wall and the covering thereon which this method and this device are designed to protect during the backfilling operation.

Referring now more particularly to the characters of reference on the drawing it will be observed that the complete pipe line padder assembly identified at 2, consists basically of: a shield or housing which is made up of an arcuate cover 3 formed to comprise a semi-circle or less in cross section and usually having a larger but generally concentric radius to that of the pipe line itself (identified in its installational condition at 4), a tapered superstructure 5 which is superimposed on the cover 3, a vertical stabilizer assembly 6 and a pulling attachment means 7.

The arcuate cover 3 is flared at its forward end as at 8 to facilitate forward movement of the pipe line padder along the pipe and cover 3 underlies the balance of the padder assembly and extends a distance beyond the rear end where it forms a section 9 known as a "skirt." At spaced locations along the cover 3 there are provided a series of cut-outs 10 (FIG. 4) which are then enclosed by a semi-cylindrical wheel case 11 that forms a part of the superstructure 5. A stationary shaft 12 extends horizontally across the interior of the wheel case 11 and projects through the side walls 13 of the case. An axle boss 14 is rigidly attached to both the shaft 12 and the side walls 13 so that the shaft 12 is not free to turn in this assembly. A grease fitting 15 may be installed in one or both ends of the shaft 12 and this fitting 15 connects by an internal channel (not shown) to both bearings 16 to permit additional lubrication if required. A rubber or other non-metallic material wheel or roller 17 is pressed onto the outer race of the bearing 16 and the inner race is pressed onto the shaft 12, so that wheels 17 are free to rotate about the shaft 12 when they are in contact with the pipe 4.

From front to rear of the assembly 2, superstructure 5 is comprised on a wheel case 11, followed by an upwardly tapering long section 18 that blends into the next following wheel case 11, and this is followed by another long section 18 which in turn is followed by another wheel case 11, and this later is followed by two units, each comprising a tapered short section 19 and a wheel case 11, and the last wheel case 11 terminates the superstructure 5 at a point just short of the end of the arcuate cover 3 and just at the start of the skirt 9.

That unit identified as the stabilizer assembly 6, in one embodiment consists only of a vertical tubular post 20 into which is slipped a smaller outside diameter tubular T 21, and a generally horizontal positioned pipe or rod 22 that slideably engages the cross member of the T 21 and projects lateraly outward therefrom. In this described embodiment, one or two workmen will need to walk along with the padder 2 and support the outer end of pipe 22 to maintain the assembly 2 in an upright attitude. In another embodiment (FIG. 3) the cross section of a smaller size T 23 engages the outer end of the pipe 22, and the vertical section of the T engages a wheel fork 24 which supports a pneumatic wheel 25 in contact with the flat area 26 of the ground. Each section of each T includes a set screw 27 to rigidly attach it in an adjustable relationship with its mating part.

In the highly skilled practice of laying a cross country pipe line in the ground, the various specific operations preceding the condition shown in FIG. 3 whereat the pipe 4 is in the trench 28 and resting on pads 29 will not be discussed in this specification as this invention deals with a method and device used in the backfilling operation only. Suffice it to say that the pipe 4 is in the ground and in the position shown in FIGS. 1–3 and ready to be covered with dirt and rock by the operation known as backfilling. The pipe, which has been thus far identified as 4, actually consists of a bare pipe 30 (FIG. 5) about which has been placed a primer coat 31 and thereover a tar-embedded fiberglass or felt wrap 32, and the entire unit being covered with a layer of kraft paper 33. The purpose of this outside coating or wrapping is to seal the bare metal pipe 30 against contact with fluids in the ground which may have a corrosive effect and to prevent the damaging effect of electrolytic action which may take place at any point the metal is exposed. Prior to being laid in the ground, the wrapping is carefully inspected (usually by instruments) to make sure there are no breaks in the wrap. However, even after this inspection takes place, it is possible for rocks that are present in the backfill material to strike the covering with a sufficient force to break through the relatively fragile paper and wrapping and thus expose the surface of the bare pipe. If this is to be prevented, it becomes necessary to virtually sift the backfill material to make sure no rocks are present and this, it will be apparent, is a very expensive and time consuming operation. One of the most common methods of backfilling a trench after the pipe has been laid therein is to have a bulldozer approach the trench 28 from the side containing the removed dirt 35 and engage a section of the dirt 35 about as wide as the bulldozer blade and push the dirt back into the trench 28 and onto and over the pipe 4. In most backfilling operations this action is performed with great speed and in most backfill materials numerous rocks are present, so that it is highly desirable to employ a method as is herein described in which the pipe may be protected without delaying the backfilling operation.

On larger size pipe, the complete padder assembly 2 may be heavier than can be handled by the workmen unaided, so an eyelet 36 may be installed near the center of gravity of the assembly to permit the lifting and lowering of the padder 2 by a hoist or crane into the trench 28 and over the pipe 4. Next a chain or other pulling means 37 is attached to the attachment 7 in such a manner that the A-frame 38 or other means employed by a tractor 39 to pull the padder 2 will apply its pulling force in the longitudinal direction of travel and from a vantage point near the ground. When the tractor is in the position shown in FIG. 2 and is at rest, the bulldozer (not shown) approaches the trench 28 from the side including the fill dirt 35 and dozes in a quantity of dirt and rocks directly onto the top of padder 2 until it is completely covered in one area. Then the tractor 39 moves forward pulling the padder 2 behind it until it has moved out from under the backfill just placed on top of it, and the operation is repeated throughout the length of the pipe 4 except, of course, in some areas where the backfill material is fine sand or some substance which does not contain rocks. As the tractor 39 moves forward, the wheel 25 of the stabilizer 6 also rolls forward and prevents the padder assembly 2 from rotating about the pipe 4 as it would tend to do as the dirt 35 slides over it and down the sides of the trench 28.

One of the unique features of this invention is the method and structure by which the backfill material overlying the padder 2 is broken up and sifted of heavy rocks by the tapered steps it goes over as the padder is pulled forward through it due to the presence of sections 18 and 19 and the wheel cases 11 which combine to form a series of first long and then short dirt moving and rock sifting steps. Once the padder has passed through the overlying backfill material, any rocks still remaining on the skirt 9 will simply lay over onto the pipe 4 by a drop of two inches or less so that no damage will be done to the outside paper 33.

From the foregoing description it will be readily seen that there has been produced a device which substantially fulfills the objects of this invention as set forth herein. The invention is not limited to the exemplary constructions herein shown and described, but may be made in many ways within the scope of the appended claims.

What is claimed is:

1. A continuous method of backfilling pipe line trenches comprising: placing a shield over the pipe line in movable relation therewith, pouring earth backfill material primarily over said shield and secondarily over said pipe line and into said trench, and continuously pulling said shield longitudinally out from under said backfill material and in a direction lengthwise of said pipe line.

2. A continuous method of backfilling pipe line trenches comprising: placing a shield over the pipe line in rolling contact therewith, pouring earth backfill material over said pipe line and into said trench, and continuously pulling said shield longitudinally out from under said backfill material and in a direction lengthwise with said pipe line.

3. A method of backfilling pipe line trenches comprising: placing a shield over the pipe line to cover approximately the top half of said pipe line while maintaining rolling contact lengthwise therewith, pouring earth backfill material containing rocks, over said shield and pipe line and into said trench until the latter is filled, and continuously pulling the shield longitudinally along the top surface of said pipe line and forward ahead of the backfill material with sufficient operator controlled speed and force to cause said backfill material to agitate and partially sift the rocks off to the side of the pipe line and into the trench.

4. A method of backfilling pipe line trenches comprising: placing a stepped shield over the pipe line in moving contact therewith, placing backfill material over said shield and pipe line and into said trench until the latter is filled, and continuously pulling the shield longitudinally along the top surface of said pipe line and forward ahead of the backfilling operation with sufficient force to cause said backfill material to rise over the steps of said shield individually and in sequence and be agitated as the shield is pulled out from under the backfill material.

5. A pipe line padder assembly comprising: a housing adapted to engage an underground pipe line from the top side thereof, an arcuate cover extending horizontally in said housing, a vertically extending wheel case on said cover, said cover defining an opening, a roller assembly supported in said wheel case and engaging said pipe line in rolling contact through said opening, an upwardly inclined superstructure connecting said horizontal cover and said vertical wheel case to provide an earth guiding step.

6. A method of backfilling pipe line trenches, comprising: placing a shield over the top side of the pipe line in rolling contact therewith, pouring earth backfill material over part of said shield and pulling the forward end of said shield out from under said material by a series of jerks, and manually stabilizing said shield in a vertical position during the operation.

7. A pipeline padder for protecting a thin covering of paper on a pipeline, comprising an arcuate housing placed on a pipeline installed in an open trench, said housing having a plurality of non-metallic rollers in direct and rolling contact with said paper covering, means to permit said padder to be power pulled longitudinally along said pipeline, and step means on said housing to cause backfill dirt to be agitated upward and drop only a short distance onto the paper covering of said pipeline by said longitudinal movement.

References Cited in the file of this patent

UNITED STATES PATENTS

| | | |
|---|---|---|
| 818,214 | Anderson | Apr. 17, 1906 |
| 1,910,481 | Smith | May 23, 1933 |
| 2,470,255 | Marks | May 17, 1949 |
| 2,633,713 | Shields | Apr. 17, 1953 |
| 2,731,738 | Kossa | Jan. 24, 1956 |
| 2,755,632 | Hauber | July 24, 1956 |
| 2,777,294 | Rosa | Jan. 15, 1957 |
| 2,866,320 | Bazzel | Dec. 30, 1958 |

FOREIGN PATENTS

| | | |
|---|---|---|
| 66,107 | Norway | July 15, 1950 |